United States Patent [19]
Vittorelli

[11] 3,947,877
[45] Mar. 30, 1976

[54] METHOD AND DEVICE FOR TIMING THE DATA READING AND THE RECORDING OPERATIONS ON A MAGNETIC TAPE

[75] Inventor: Vittore Vittorelli, Ivrea (Turin), Italy

[73] Assignee: Ing. C. Olivetti & C., S.p.A., Ivrea (Turin), Italy

[22] Filed: Oct. 31, 1974

[21] Appl. No.: 519,704

Related U.S. Application Data

[63] Continuation of Ser. No. 378,355, July 11, 1973.

[30] Foreign Application Priority Data
July 17, 1972   Italy .................................. 69310/72

[52] U.S. Cl. .................................................. 360/48
[51] Int. Cl.² .......................................... G11B 5/09
[58] Field of Search .................... 360/39, 48, 50, 51

[56] References Cited
UNITED STATES PATENTS
3,399,394   8/1968   Smith ................................. 360/48
3,631,421   12/1971   Perkins ............................... 360/48

*Primary Examiner*—Vincent P. Canney
*Attorney, Agent, or Firm*—I. J. Schaefer

[57] ABSTRACT

A magnetic information recording and reading device is embodied in an electronic equipment for the data processing. On a plurality of parallel tracks of a magnetic tape are recorded information blocks aligned at the starting point so as to form a matrix of information blocks. Each column of information blocks is addressable by a corresponding address recorded in a further track of the tape. Each address block comprises a timing character sequence for the addressing of an information block and for synchronizing the reading and/or the recording of data. The energization of a recording head is controlled by the readinng of timing character included in the corresponding address block so that the recording starting point of each of the information blocks are perfectly aligned independently from the speed of the tape.

6 Claims, 3 Drawing Figures

METHOD AND DEVICE FOR TIMING THE DATA READING AND THE RECORDING OPERATIONS ON A MAGNETIC TAPE

This is a continuation of application Ser. No. 378,355 filed July 11,1973.

BACKGROUND OF THE INVENTION

1. Field of the invention

The present invention relates to a magnetic information recording-reading device serially recorded in separate information blocks on a magnetic support having a plurality of tracks, one of said tracks being reserved to record separate address blocks of said information blocks and including a multichannel recording and reading head.

2. Description of the prior art

In the prior art recording and reading devices, firstly is recognized address of an information block in which data are to be recorded thereafter, the starting point of the recording operation is defined by means of timing devices which energize the recording circuits after a fixed delay time starting from the reading of the address of the block. The main problem of such devices is that the alignment of the information blocks are depending on the speed of the tape at the moment of the recording operation. More particularly because of the fixed delay time, the gap length between the address block and the starting point of the recording operation is directly proportional to the tape speed. Such timing devices complicate the structure of the recording devices and to increase the cost thereof.

OBJECTS AND SUMMARY OF THE INVENTION

The disadvantages of such known devices are overcome by the magnetic information recording-reading device and method according to the invention by providing for each of said address blocks a timing character sequence for timing the energization of the recording head after the reading of a corresponding address character so that the recording starting point of each of said information blocks is perfectly defined and is independent from the speed of the tape.

This and other features of the invention will become apparent from the following description of a preferred embodiment and accompanying drawing.

DETAILED DESCRIPTION OF THE INVENTION

Figure 1:
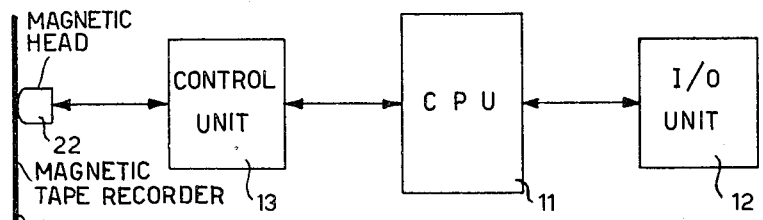
FIG. 1 is a block diagram of an electronic equipment using a magnetic information recording and reading device according to the invention.

The recording and reading device according to the invention is embodied in a digital data processing unit, and comprises a magnetic tape storage 10 (FIG. 1), a control unit 13 for performing input-output functions and a central unit 11 for operating the control unit 13.

A particular embodiment of the control unit 31 is described in U.S. Patent Ser. No. 3,505,600. A plurality of parallel recording tracks 14. The first track 16 includes a program control section 20 and a block address 19. The other tracks 15 are reserved for storing data disposed in block 17 of constant length. All the data are stored on each track 14 serially per bit, and serially per characters. The blocks 17, or information blocks, are recorded on the tracks 15 and they store data to be processed. The blocks 19, or the address blocks, are recorded on the track 16 and they store block addresses, and the blocks 20 or program blocks, are recorded on the same track 16 and store the programs. Blocks 17 are spaced by a gap 18, the blocks 19 and 20 are spaced by a gap 21. Gaps 18 and 21 are defined by a magnetization of constant polarity of the track.

The information blocks 17 (FIG. 2) are orderly arranged on each track in such a manner that the start of each block 17 corresponds to the start of the corresponding blocks 17 on the other tracks 15. In this way the information blocks 17 relating to the same address block are aligned therewith and transversely disposed on the tape.

Moreover to the start of each block 20, is aligned to the start of other blocks 17 on the tracks 15. Therefore, such arrangement in columns of the blocks 17 determines an information block matrix on the tape 10.

The recording of the bits on the blocks 17, 19, 20 is accomplished according to a known technique, as well as the recording of the gaps 18, 21.

Each recording head 23 records information sent by the central unit 11 on the corresponding track 17 under the control of the control unit 13.

Figure 2:
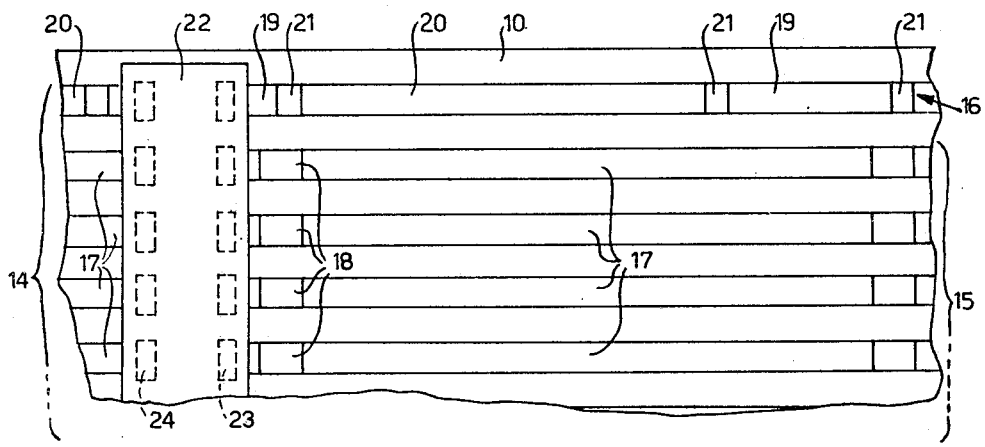
FIG. 2 shows a part of a magnetic tape the tracks whereof are set up blocks of the recorded data.

The access to a given block 17 (FIG. 2) both in the recording and in the reading operations is operated by the control unit 13 (FIG. 1), which is not described in details, because it is already known in the art of data processing by means of the addressing data recorded in a block 19 (FIG. 2). The control unit 13 causes the reading head 24 of the head 22, corresponding to the track 16 of the magnetic tape 10, to read the addresses contained in the blocks 19, until the address corresponding to the required block 17 is recognized. The way of recognizing the selected address is commonly known, particularly it is performed by comparing the address read by the head 24 with the address stored in the C P U. Subsequently, the control unit 13 selects the recording head 23 or the reading head 24 corresponding to the track 15 whereon the data are to be recorded or read.

According to the invention, each address block 19 comprises 25 characters, while each program block comprises 70 characters.

The blocks 17 have all the same lenght and comprises 90 characters whereby its length is less than the total length of the blocks 19 and 20. The gaps 18 are therefore of 17 characters.

Figure 3:
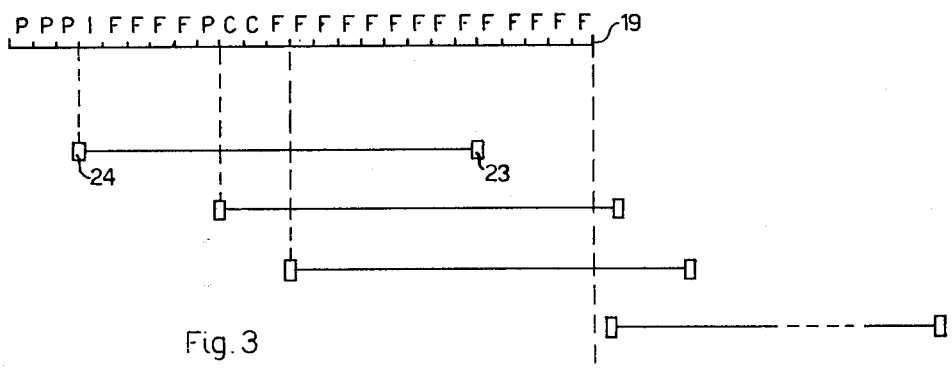
FIG. 3 used by the device of FIG. 1; ation.

In particular, the 25 characters of each block 19 are recorded serially according to a predetermined order as shown in the FIG. 3. The first three characters P of a block 19 are equal and are called the preamble as they identify an address block 19 instead of a program block 20. The further character I is the addressing character, and it is used by the central unit 11 (FIG. 1) in every addressing operation. There follow then four filling characters F (FIG. 3). The ninth character is a preamble character P or first service character which is equal to the first three characters P as considered above, and the function whereof is to define the starting point of the gap 18 before each block 17. The tenth and eleventh character are two characters C or erasing characters controlling the erasing operation of the gap 18 (FIG. 2) of the addresses block 15, the remaining characters are filling characters the first of these filling characters is used as a second service character for enabling the recording of data.

For a good understanding of this address format is to be noted that the head 23 is separated from the corresponding reading head 24 (FIG. 2) by a space equal to 17 characters,. The position of the recording head 23 and the reading head 24 during the reading operation of a block 19 is shown in FIG. 3, in which the recording head 23 precedes the reading head 24 with respect to the movement of the tape. Now is described the method according to the invention.

For recording the data on a particular information block 17 (FIG. 2), the magnetic tape 10 is displaced so that the reading head 24 as the track 16 sequentially reads the blocks 19, 20. Each address block 19 is selected by the control unit 13 with respect to each program block 20 by means of the three first preamble characters P. Thereafter, the address character I of the information block 19 is read. If the character I read corresponds to the address character of the required information block 17, being set up on the unit 13, the central unit 11 (FIG. 1) and the control unit 13 predispose their circuits in a known way, for the recording operation.

The recording head 23 (FIG. 2) corresponding to the tracks 15 is located, at the same instant, in correspondence with the twenty-first character of the block 19 (FIG. 13). After the reading of the four filling characters F following the address character I, the reading head 24, recognizes the ninth preamble character P wherefore it starts the erasing operation of the gap 18.

The duration of the erasing stage is defined by the two characters C following the ninth character. The length of the erasing gap is equal to 3 characters since the erasing stage starts at the time instant whereat the ninth character P is read, and ends at the time instant whereat the first filling character F next following the characters C is read. In the time instant whereat the erasing stage has started the recording head 23 has just surpassed the twenty-fifth character of the address-block 19.

At the end of the twelveth character of the block 19, the recording head 23 (which is displaced 17 characters from the reading head 24) of the selected track 15 is located exactly at the starting point of the block 17 to be recorded.

Therefore, the first filling character F causes the recording head 23 to immediately record the data after the erasing gap just recorded. In such a way the thirteenth character (F) determines the starting point of each information block 17 of the same column on the tape 10. The thirteenth character of the block 19 being in a fixed location, assures also a fixed starting point of each block 17 of the column, independently from the speed of the tape.

Therefore these thirteen characters of each address block 19, constitute a timing character sequence adapted to control the recording operation after a fixed delay represented by the time interval comprised between the reading of the character I and the thirteen character F.

The remaining filling characters F after the thirteen character F of each block 19 are used to prevent the reading by the head 24 of the addressed block 17 or program block 20 until this head 24 is carried in front of the respective starting point. In fact, the reading operation of a block 17 is started after the last of the characters F was recognized, that is, when the reading head 24, is on the gaps 18, near each starting point of a column of blocks 17.

In this way twenty-five characters of each address block 19 are linear references for the head 22 for timing the read-write operations on the magnetic tape and, more particurarly, for the exact definition of the recording start point of the blocks 17. By the foregoing it is clear that the method and the device now described control the reading/recording operations independently from the speed of the tape in an inexpensive way.

It is to be understood that the magnetic information recording and reading device herein described may be changed or modified without departing from the scope of the invention which is to be measured from the appended claims.

What I claim is:

1. A method for timing the data recording and reading operation in a recording-reading device using a magnetic tape having a plurality of parallel tracks for storing data in blocks of characters separated by constant gaps and a track for storing addresses of said data blocks, comprising a reading head and a recording head preceding said reading head with respect to the movement of the tape, the method comprising the steps of:
   — recording in said addressing blocks an addressing character identifying the blocks aligned therewith transversely disposed on said tape,
   — recording a first service character at a fixed distance from said addressing character to arrange said recording head to record the gap corresponding to said addressing character,
   — recording at least one erasing character following said first service character for defining a period proportional to the speed of the tape during which said recording head is enabled to record said gap according to the length of said erasing character on said magnetic tape, and
   — recording a second service character following said erasing character for enabling said recording head to record said data on the block corresponding to said address, whereby the interval before the start of the recording of data in a block is proportional to the speed of the tape.

2. A method as in claim 1 wherein the step of recording a first service character at a fixed distance from said addressing character comprises the step of:
   — recording at least one filling character between said address character and said first service character thereby defining said fixed distance.

3. A method as in claim 1 further comprising the step of:
   — recording after said second service character at least one successive filling character, the last of which enabling said reading head to start the reading of the block of data identified by said address character.

4. A method as in claim 3 further comprising the step of:
   — positioning said recording head at a distance from said reading head at least equal to the distance between said first service character and said last filling character.

5. In combination: an apparatus for reading and recording data on a magnetic tape comprising a plurality of parallel tracks for storing data in blocks separated by constant gaps and a track for storing addresses of said data block, the apparatus comprising a reading head and a recording head preceding said reading head with respect to the movement of the tape; and means for controlling the start of said reading and said recording in dependence on the speed of said tape comprising a first service character recorded at a fixed distance from an addressing character previously recorded on said tape for enabling said recording head to record the gap corresponding to said addressing character, at least one successive erasing character recorded after said first service character and defining a period proportional to the speed of the tape for enabling said recording head to record the gap defined by said period and a second service character recorded after said erasing character for enabling said recording head to record data on the block corresponding to said addressing character.

6. A combination according to claim 5, wherein the controlling means further comprises: at least one successive filling character recorded after said second service character, the last of said filling characters enabling said reading head to start the reading of the block of data corresponding to said character address.

* * * * *

UNITED STATES PATENT OFFICE
CERTIFICATE OF CORRECTION

PATENT NO. : 3,947,877
DATED : March 30, 1976
INVENTOR(S) : Vittore Vittorelli

It is certified that error appears in the above-identified patent and that said Letters Patent are hereby corrected as shown below:

Column 3, line 26 delete "13" and insert --3--.

In the Drawings change Figure 1 from this:

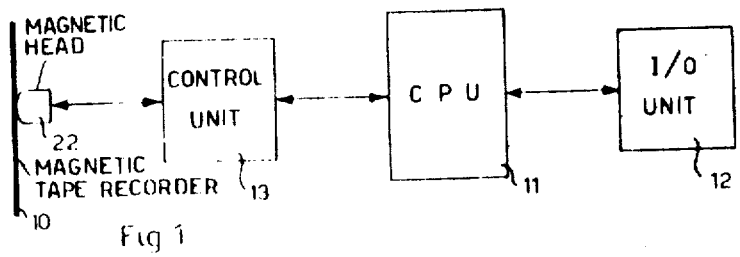

To this:

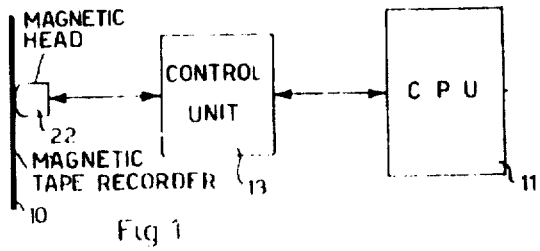

Signed and Sealed this

Twentieth Day of July 1976

[SEAL]

Attest:

RUTH C. MASON
*Attesting Officer*

C. MARSHALL DANN
*Commissioner of Patents and Trademarks*